US007596447B2

(12) United States Patent
Oono

(10) Patent No.: US 7,596,447 B2
(45) Date of Patent: Sep. 29, 2009

(54) CONTROL APPARATUS FOR INTERNAL-COMBUSTION ENGINE

(75) Inventor: Takahiko Oono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 11/965,217

(22) Filed: Dec. 27, 2007

(65) Prior Publication Data

US 2008/0294327 A1 Nov. 27, 2008

(30) Foreign Application Priority Data

May 21, 2007 (JP) .......................... P2007-134029

(51) Int. Cl.
*G06F 19/00* (2006.01)
*F02M 1/00* (2006.01)

(52) U.S. Cl. ........................ 701/114; 701/29; 123/457; 123/479; 123/690

(58) Field of Classification Search ................ 701/104, 701/105, 107, 114, 29, 34; 123/446, 457, 123/479, 502, 690
See application file for complete search history.

(56) References Cited

U.S. PATENT DOCUMENTS 7,025,050 B2 * 4/2006 Oono et al. ................ 123/690
7,168,413 B2 * 1/2007 Oono ........................ 123/479
2004/0007213 A1 * 1/2004 Oono ........................ 123/495
2005/0263146 A1 * 12/2005 Oono et al. ................ 123/690
2006/0147317 A1 * 7/2006 Okamoto et al. ............ 417/297
2007/0006849 A1 * 1/2007 Mashiki ...................... 123/457
2007/0034191 A1 * 2/2007 Oono ........................ 123/456
2007/0079809 A1 * 4/2007 Oono ........................ 123/456

FOREIGN PATENT DOCUMENTS

JP 10-054317 A 2/1998
JP 10238392 A 9/1998
JP 2001-182597 A 7/2001
JP 2006-029097 A 2/2006

* cited by examiner

*Primary Examiner*—John T Kwon
(74) *Attorney, Agent, or Firm*—Sughrue Mion, PLLC

(57) ABSTRACT

Provision is made to avoid a fuel discharge timing and a fuel injection timing during the ordinary operation of the engine from being limited, by, upon the activation of an engine, making a high-pressure fuel pump perform high-pressure-fuel discharge operation prior to initial fuel discharge operation by a fuel injection valve and based on the condition of the resultant fuel-pressure rise, performing a diagnosis on whether or not a malfunction exists in a high-pressure fuel system.

8 Claims, 6 Drawing Sheets

CONTROL APPARATUS FOR INTERNAL-COMBUSTION ENGINE

BACKGROUND OF THE INVENTION

1. Field of the Invention

The present invention relates to a control apparatus for an internal-combustion engine, e.g., an in-cylinder direct-injection internal-combustion engine, and more particularly to a high-pressure-fuel-system control apparatus that is provided with a malfunction diagnosis function for realizing, with a simple control method, a diagnosis on whether or not a malfunction is caused in a high-pressure fuel system while the engine is activated.

2. Description of the Related Art

In a in-cylinder direct-injection internal-combustion engine, a so-called high-pressure-fuel-system control apparatus is employed in which a high-pressure fuel is supplied from a high-pressure fuel pump to a fuel injection valve, and the fuel is supplied in such a way as to be injected from the fuel injection valve directly into a combustion chamber.

As a method of diagnosing whether or not a malfunction is caused in such a high-pressure-fuel-system control apparatus, for example, a method disclosed in Japanese Patent Application Laid-Open No. 1998-238392 (Patent Document 1) is known.

In the diagnosis method disclosed in Patent Document 1 described above, firstly, by detecting a fuel-pressure change between the fuel pressure prior to discharge of the fuel from a high-pressure fuel pump and the fuel pressure after the discharge of the fuel, and by presuming a fuel-pressure change between the fuel pressure prior to the discharge of the fuel from the high-pressure fuel pump and the fuel pressure after the discharge of the fuel, based on a drive-timing command value for a flow-rate control valve provided in the high-pressure fuel pump, the difference between the actually measured value and the presumed value of the fuel-pressure change is calculated; in the case where the calculated value exceeds a predetermined determination value, it is determined that a malfunction related to the high-pressure fuel pump has been caused.

However, in general, during the operation of the engine, both the timing of fuel discharge from the high-pressure fuel pump and the timing of fuel injection from the fuel injection valve are changed, based on the operation condition of the engine. When, due to the changes, based on the operation condition of the engine, in the fuel discharge timing and the fuel injection timing, the fuel discharge and the fuel injection are concurrently carried out, the fuel-pressure change due to the fuel discharge cannot be distinguished from the fuel-pressure change due to the fuel injection, with the foregoing conventional determination method, whereby erroneous determination may be made.

Moreover, in general, also upon the activation of the engine, both the control of fuel discharge from the high-pressure fuel pump and the control of fuel injection from the fuel injection valve are started immediately after the completion of discrimination of an engine cylinder; therefore, it is inevitable that the fuel discharge and the fuel injection are concurrently carried out.

When, as described above, the fuel discharge and the fuel injection are concurrently carried out, the fuel pressure is reduced due to the fuel injection, in the case where the fuel-pressure change between the fuel pressure prior to the fuel discharge and the fuel pressure after the fuel discharge is detected, whereby the fuel-pressure change to be detected is diminished; therefore, there is a possibility that an malfunction in the high-pressure fuel pump is determined, even though the fuel discharge is being correctly carried out.

Thus, in Patent Document 1 described above, the fuel-discharge timing and the fuel-injection timing are set in a limiting manner so that, during the operation of the engine, the fuel discharge and the fuel injection are carried out during separate intervals. As a result, the malfunction diagnosis is performed by setting the fuel-discharge timing and the fuel-injection timing in such a way as to avoid the deterioration in the malfunction-determination accuracy.

However, the conventional setting of the fuel-discharge timing and the fuel-injection timing for the purpose of a diagnosis limits the fuel-discharge timing and the fuel-injection timing so as to be deviated from the optimal timings. Accordingly, the pressure of the fuel supplied to the fuel injection valve may not rapidly be raised up to the target pressure corresponding to the operation condition of the engine, or the fuel may not be injected at the optimal timing corresponding to the operation condition of the engine.

[Patent Document 1] Japanese Patent Application Laid-Open No. H10-238392

SUMMARY OF THE INVENTION

The present invention has been implemented in consideration of the foregoing conventional problems; the objective of the present invention is to provide a high-pressure-fuel-system control apparatus, for an internal-combustion engine, which can prevent as much as possible the fuel-discharge timing and the fuel-injection timing during the normal operation of the engine from being limited due to a diagnosis and can realize with a simple method a diagnosis on whether or not a malfunction is caused in the high-pressure fuel system.

Means for achieving the foregoing objectives and the actions and effects thereof will be described below. In a high-pressure-fuel-system control apparatus, according to a first aspect of the present invention for an internal-combustion engine, which is provided with a high-pressure fuel pump for taking in a fuel from a fuel tank, pressurizing the fuel, and then discharging the pressurized fuel; a fuel injection valve for injecting the fuel discharged from the high-pressure fuel pump into a cylinder of an internal-combustion engine; a fuel-pressure sensor for detecting a pressure of the fuel discharged from the high-pressure fuel pump; and a high-pressure-fuel-pump control means for, during operation of the internal-combustion engine, controlling an amount of the fuel discharged from the high-pressure fuel pump, by controlling a drive timing of a flow-rate control valve provided in the high-pressure fuel pump in such a way that a target pressure set in accordance with a condition of the engine coincides with the fuel pressure detected by the fuel-pressure sensor, provision is made for a high-pressure-fuel-system diagnosis means for, upon activation of an engine, making the high-pressure fuel pump perform high-pressure-fuel discharge operation prior to initial fuel injection operation by the fuel injection valve and based on the condition of the resultant fuel-pressure rise, performing a diagnosis on whether or not a malfunction exists in a high-pressure fuel system.

According to the first aspect of the present invention, upon the activation of the engine, the high-pressure fuel pump discharges a pressurized fuel prior to the start of fuel injection by the fuel injection valve. Accordingly, the fuel pressure detected in this situation has not been lowered through the fuel injection; therefore, only the condition of fuel-pressure rise in accordance with the amount of the fuel discharged from the high-pressure fuel pump can be detected.

As a result, erroneous determination in the diagnosis, due to a diagnosis being performed with fuel discharge and fuel injection overlapped, which has been a conventional problem is avoided. In addition, because, during the activation of the engine, control operation related to the diagnosis can be completed, the fuel discharge timing and the fuel injection timing, after the cylinder discrimination has been completed, the fuel injection has been started, and then the engine has come into the ordinary operation mode, are avoided from being limited for the purpose of the diagnosis; in other words, during the ordinary operation mode, the internal-combustion engine can be operated with optimal drive timings.

Moreover, according to a second aspect of the present invention, in the case where a rising amount of the fuel pressure produced by the pressurized fuel discharged prior to the initial fuel injection by the fuel injection valve is the same as or smaller than a predetermined malfunction determination amount, it is determined that a malfunction exists in any one of the high-pressure fuel pump, the flow-rate control valve and the fuel-pressure sensor.

According to the second aspect of the present invention, it is not required to presume, based on a drive-timing command value for the flow-rate control valve, a fuel-pressure change between the fuel pressure prior to discharge of the fuel and the fuel pressure after the discharge, whereby whether or not a malfunction exists can be determined only through actually measured value of the fuel-pressure change between the fuel pressure prior to discharge of the fuel and the fuel pressure after the discharge; therefore, because anxiety of erroneous determination due to an error in presuming the fuel-pressure change is eliminated, the diagnosis method can be enhanced in terms of the accuracy and simplified.

Still moreover, according to a third aspect of the present invention, provision is made for a flow-rate-control-valve forcible drive means for making the high-pressure fuel pump perform high-pressure-fuel discharge operation prior to the initial fuel injection by the fuel injection valve, by, before completion of cylinder discrimination during the activation of the engine, forcibly driving the flow-rate control valve in such a way that the high-pressure fuel pump discharges the fuel of a maximal amount that can be discharge-controlled.

In order to control the fuel discharge amount of the high-pressure fuel pump to be a predetermined value, it is required to control the drive of the flow-rate control valve at a predetermined timing; for that purpose, it is at least required that the cylinder discrimination has been completed and the rotation position of the engine is known. However, if the fuel discharge is started after the cylinder discrimination has been completed, the fuel injection valve has already been rendered ready for discharging the fuel; therefore, the high-pressure fuel pump cannot discharge the pressurized fuel before the initial fuel injection operation is started by the fuel injection valve.

Thus, in the present invention, before the cylinder discrimination has been completed, forcible driving control, instead of the timing control, of the flow-rate control valve is performed. Accordingly, it is made possible that, prior to the first fuel injection operation, the high-pressure fuel pump discharges a pressurized fuel of an approximately maximal amount that can be discharge-controlled. As a result, with regard to the condition of fuel-pressure rise produced by the pressurized fuel being discharged from the high-pressure fuel pump, the fuel-pressure amount in accordance with high-pressure-fuel discharge, from the high-pressure fuel pump, of an approximately maximal amount that can be discharge-controlled can be obtained, whereby erroneous determination in the malfunction diagnosis can be prevented. That is to say, in setting of a malfunction determination amount for determining a malfunction, the margin for erroneous determination can be enlarged.

In addition, the method of applying forcible driving control to the flow-rate control valve prior to the completion of the cylinder discrimination can be realized in accordance with the design structure of a high-pressure fuel pump to be utilized, for example, by use of a method disclosed in Japanese Patent Application Laid-Open No. 2001-182597 or Japanese Patent Application Laid-Open No. 2002-309988; however, because the present invention is not to contrive the method itself, the explanation therefore will be omitted.

Furthermore, according to a fourth aspect of the present invention, provision is made for a fuel-injection prohibition means for making the high-pressure fuel pump perform high-pressure-fuel discharge operation prior to the initial fuel injection by the fuel injection valve, by, during a predetermined interval after completion of the cylinder discrimination during activation of the engine, prohibiting fuel injection by the fuel injection valve.

In the case where, prior to the completion of the cylinder discrimination, the flow-rate control valve is forcibly driven, the high-pressure fuel pump can discharge a pressurized fuel of an approximately maximal amount that can be discharged; however, depending on the engine-stop position prior to the activation of the engine or the number of pump cams for driving the high-pressure fuel pump, the total amount of the fuel discharged in the interval between the activation of the engine and the completion of the cylinder discrimination is small; thus, it is presumed that the rising amount of the fuel pressure produced by the pressurized fuel being discharged cannot be enlarged.

For such an internal-combustion engine, by prohibiting the fuel injection for a predetermined interval immediately after the completion of the cylinder discrimination or by prohibiting a predetermined times of fuel injection, the opportunity that only the pressurized-fuel discharge by high-pressure fuel pump is performed increases; therefore, the rising amount of the fuel pressure can sufficiently be enlarged.

Moreover, according to a fifth aspect of the present invention, provision is made for a first diagnosis prohibition means for prohibiting implementation of control related to a diagnosis on whether or not a malfunction exists, in the case where the fuel pressure detected prior to the start of initial high-pressure-fuel discharge operation by the high-pressure fuel pump is the same as or lower than a predetermined low-pressure value that is lower than the feed fuel pressure.

For example, in the case where the driver tries to activate the engine, without knowing that "the fuel tank is empty", the fuel pressure by no means rises because, in fact, no fuel is supplied; therefore, because the detected rising amount of the fuel pressure does not exceed the malfunction determination amount, erroneous determination may be performed. Accordingly, in the case where the fuel pressure, detected before the high-pressure fuel pump starts an initial high-pressure-fuel discharge operation, e.g., detected immediately before the engine starts to rotate after the activation switch has been turned on, is the same as or lower than a predetermined low-pressure value that is lower than the feed fuel pressure, it is determined that such an occasion may exists, and the implementation of control related to the malfunction diagnosis is prohibited. As a result, an erroneous diagnosis in the case where the engine is activated under such circumstances as being out of gas is prevented.

Still moreover, according to a sixth aspect of the present invention, provision is made for a second diagnosis prohibition means for prohibiting implementation of control related to a diagnosis on whether or not a malfunction exists, in the case where the fuel pressure detected prior to the start of initial high-pressure-fuel discharge operation by the high-pressure fuel pump is the same as or higher than a predetermined high-pressure value that is higher than the feed fuel pressure.

For example, immediately after a running engine stops, the fuel pressure maintains a high-pressure value that is approximately the same as the target pressure to which the fuel pressure has been controlled to approach. The high-pressure value has a property of lowering with time; however, at the time immediately after the engine has stopped, the high-pressure value may still be maintained. In the case where, under the foregoing condition, the engine is immediately activated again, the fuel pressure, due to fuel discharge prior to fuel injection, may become so high as to exceed the target pressure to a large extent. In consequence, it is conceivable that the fuel pressure becomes so higher than the target pressure after the activation that the exhaust-gas performance and the idling stability are damaged, and when the fuel pressure becomes further higher, the drive energy becomes insufficient, whereby the fuel injection valve cannot be driven.

In addition, it is determined without performing a malfunction diagnosis that the fact that the fuel pressure detected before the high-pressure fuel pump starts initial high-pressure-fuel discharge operation is significantly high may suggest that the high-pressure fuel pump and the fuel discharge valve have functioned normally.

Accordingly, in the case where the fuel pressure, detected by the fuel-pressure sensor before the high-pressure fuel pump starts initial high-pressure-fuel discharge operation, e.g., detected immediately before the engine starts to rotate after the activation switch has been turned on, is the same as or higher than a predetermined high-pressure value that is higher than the feed fuel pressure, it is determined that such an occasion may exists, and the implementation of control related to the malfunction diagnosis is prohibited. As a result, the fuel pressure that is high when the engine is activated is prevented from becoming far higher than the target pressure.

According to the present invention, it can be realized that a malfunction diagnosis on a high-pressure fuel system is performed, while limitation of the fuel discharge timing and the fuel injection timing, during the ordinary operation of the engine, for the purpose of a malfunction diagnosis on the high-pressure fuel system is avoided and the anxiety of an erroneous diagnosis or the anxiety that the fuel pressure becomes too low or too high is eliminated.

DETAILED DESCRIPTION OF THE PREFERRED EMBODIMENT

Embodiment 1

Hereinafter, Embodiment 1 of the present invention will be explained in detail, with reference to the accompanying drawings.

Figure 2:
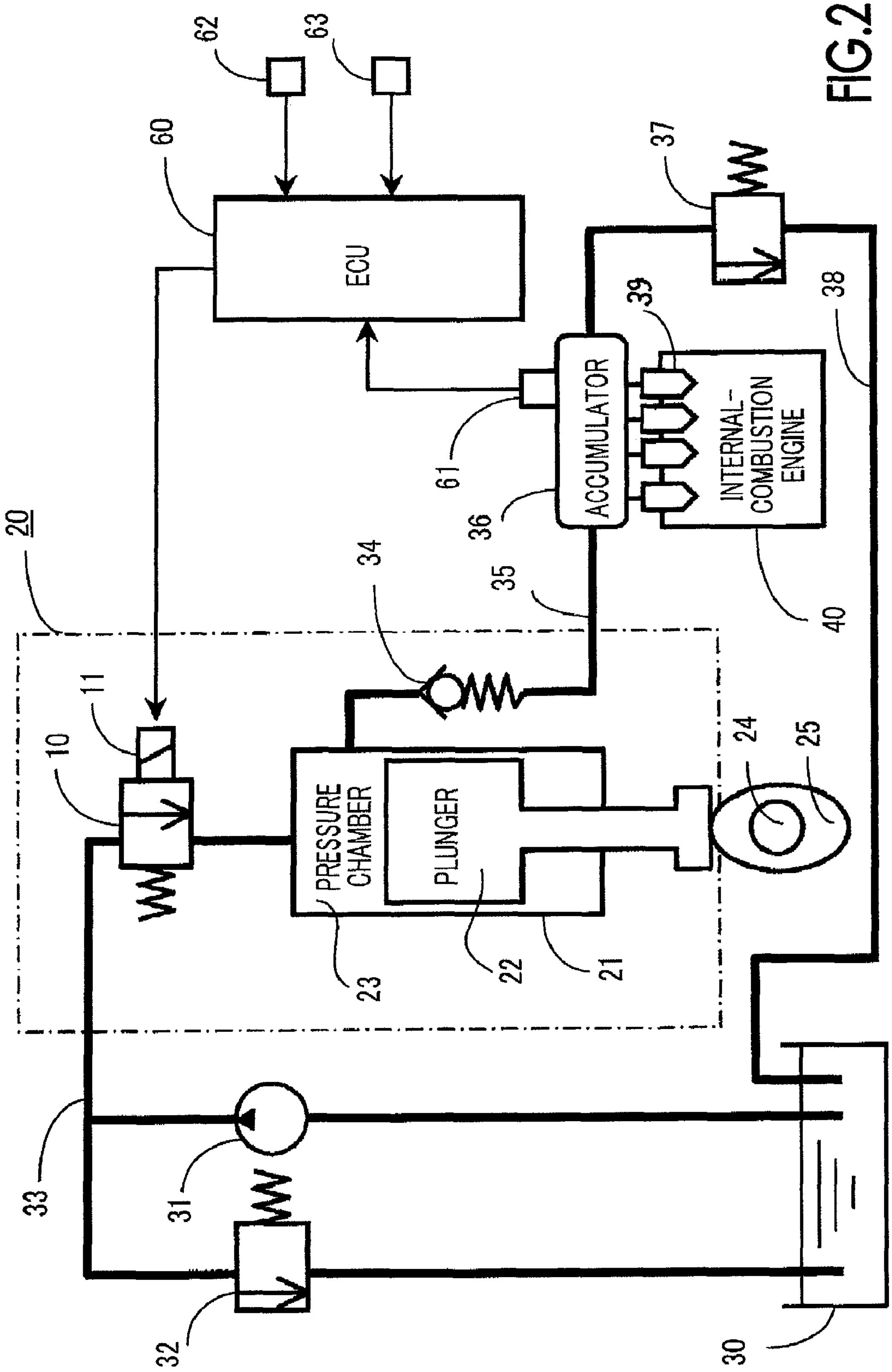
FIG. 2 is a configuration diagram schematically illustrating a high-pressure-fuel-system control apparatus according to Embodiment 1 of the present invention.

FIG. 2 is a configuration diagram schematically illustrating a high-pressure-fuel-system control apparatus, for an internal-combustion engine, according to the present invention; the high-pressure-fuel-system control apparatus includes a high-pressure-fuel-system diagnosis means.

The high-pressure-fuel-system control apparatus, illustrated in FIG. 2, for an internal-combustion engine is provided with a fuel supply system including a high-pressure fuel pump 20 having a normally-opened flow-rate control valve 10 with a solenoid 11, a cylinder 21, a plunger 22, a pressure chamber 23, and a fuel discharge valve (check valve) 34; a camshaft 24, for the internal-combustion engine 40, having a pump cam 25; a fuel tank 30 filled with a fuel; a low-pressure path 33 connected to the fuel tank 30 via a low-pressure fuel pump 31 and a low-pressure regulator 32; a high-pressure path (discharge path) 35 connected to a accumulator 36 via the fuel discharge valve 34; a relief path 38 that connects the accumulator 36 with the fuel tank 30 via a relief valve 37; and a fuel injection valve 39 that injects a fuel accumulated in the accumulator 36 into each of the combustion chambers of the internal-combustion engine 40 so as to supply the fuel thereto.

Additionally, the high-pressure-fuel-system control apparatus is provided with a control system including an ECU that controls the valve closing timing for the flow-rate control valve 10, by energizing the solenoid 11. In addition, as driving information on the internal-combustion engine 40, detection signals from various kinds of sensors, such as a fuel-pressure sensor 61 for detecting a fuel pressure inside the accumulator 36, a rotation sensor 62 for detecting the rotation position and the rotation speed of the internal-combustion engine, and an accelerator position sensor 63 for detecting an accelerator-depressing amount, are inputted to the ECU 60.

The low-pressure fuel pump 31 pumps up the fuel from the fuel tank 30 and discharges the fuel into the low-pressure path 33; in the high-pressure fuel pump 20, the fuel discharged from the low-pressure fuel pump 31 is taken in and discharged by the pressure chamber 23. The low-pressure path 33 is connected via the flow-rate control valve 10 to the upstream side of the pressure chamber 23 in the high-pressure fuel pump 20. That is to say, the flow-rate control valve 10 is disposed in a fuel path that connects the low-pressure path 33 with the pressure chamber 23. In addition, the fuel discharge valve 34 is disposed in the high-pressure path 35 that connects the accumulator 36 with the pressure chamber 23.

A high-pressure fuel in the accumulator 36 is injected by the fuel injection valve 39 directly into the respective cylinders of the internal-combustion engine 40 so as to be supplied thereto. A fuel-pressure sensor 61 detects a fuel pressure PF inside the accumulator 36 and outputs the fuel pressure PF to the ECU 60.

The feed fuel pressure of the fuel, which, in the low-pressure path 33 of the fuel supply system, is discharged from the low-pressure fuel pump 31, is adjusted by the low-pressure regulator 32 to a predetermined feed fuel pressure (e.g., 0.4 MPa); the fuel is introduced into the pressure chamber 23, through the flow-rate control valve 10 which is opened while the plunger 22 moves downward in the cylinder 21.

The plunger 22 performs reciprocal operation in the cylinder 21, in synchronization with the rotation of the internal-combustion engine 40. Accordingly, while the plunger 22 moves downward (in the fuel-fuel intake stroke), the high-pressure fuel pump 20 takes in the fuel from the low-pressure path 33 and introduces the fuel into the pressure chamber 23, through the opened flow-rate control valve 10; while the plunger 22 moves upward (in the fuel-fuel discharge stroke) and the flow-rate control valve 10 is closed, the high-pressure fuel pump 20 pressurizes the fuel in the pressure chamber 23 so as to transport and supply the fuel to the accumulator 36, through the fuel discharge valve 34.

The pressure chamber 23 is formed in such a way as to be defined with the inner-circumference wall face of the cylinder 21 and the top-end face of the plunger 22 The bottom end of the plunger 22 is pressed against the pump cam 25 provided on the camshaft 24 of the internal-combustion engine 40; when the pump cam 25 rotates in conjunction with the rotation of the camshaft 24, the plunger 22 performs reciprocal operation in the cylinder 21, whereby the volume of the pressure chamber 23 is increased or decreased.

The high-pressure path 35 connected to the downstream side of the pressure chamber 23 is connected to the accumulator 36, by way of the normally-closed fuel discharge valve 34 formed of a check valve that permits only the fuel, which heads for the accumulator 36 from the pressure chamber 23, to pass. The accumulator 36 accumulates and holds the high-pressure fuel discharged from the pressure chamber 23 and distributes the accumulated high-pressure fuel to the respective fuel injection valves 39.

The relief valve 37, which is formed of a normally-closed valve that opens with a pressure the same as or higher than a predetermined pressure (valve-opening-pressure setting value) and connected to the accumulator 36, opens in the case where the fuel pressure inside the accumulator 36 is about to exceed the valve-opening-pressure setting value for the relief valve 37. Accordingly, the fuel, in the accumulator 36, whose pressure is about to exceed the valve-opening-pressure setting value is returned through the relief path 38 to the fuel tank 30, whereby the fuel pressure inside the accumulator 36 is prevented from becoming extremely high.

The valve-closing drive timing for the flow-rate control valve 10, which is provided in the low-pressure path 33 that connects the low-pressure fuel pump 31 with the pressure chamber 23, is controlled by the ECU 60 (the energizing timing for the solenoid 11 is controlled), so that the amount of the fuel to be discharged from the high-pressure fuel pump 20 to the accumulator 36 is adjusted. In the case where, in the high-pressure fuel pump 20, the plunger 22 moves upward in the cylinder 21 and the flow-rate control valve 10 is opened (the solenoid 11 is not energized), the upward stroke of the plunger 22 makes the fuel that has been taken in by the pressure chamber 23 return from the pressure chamber 23 to the low-pressure path 33, by way of the flow-rate control valve 10; therefore, the high-pressure fuel is not pressurized to be transported to the accumulator 36.

In contrast, after, at a predetermined timing while the plunger 22 moves upward in the cylinder 21, the flow-rate control valve 10 is closed (the solenoid 11 is energized), in response to the upward stroke of the plunger 22, the fuel that has been pressurized in the pressure chamber 23 is discharged to the discharge path 35 and pressurized to be transported via the fuel discharge valve 34 to the accumulator 36.

The ECU 60 receives, as various kinds of driving-condition information items, the fuel pressure, inside the accumulator 36, which is detected by the fuel-pressure sensor 61, the rotation position and the rotation speed, of the internal-combustion engine 40, which are detected through an output signal pulse from the rotation sensor 62, the accelerator-pedal depressing amount which is detected by the accelerator position sensor 63, and the like.

Additionally, the ECU 60 decides a target pressure, based on the rotation speed, of the internal-combustion engine 40, which is detected through the output signal pulse from the rotation sensor 62, and the accelerator-pedal depressing amount detected, which is detected by the accelerator position sensor 63; by controlling the valve-closing drive timing (the energizing timing for the solenoid 11) for the flow-rate control valve 10, the ECU 60 controls the fuel amount to be discharged from the high-pressure fuel pump 20 to the accumulator 36 so that the target pressure coincides with the fuel pressure, inside the accumulator 36, which is detected by the fuel-pressure sensor 61.

Figure 1:
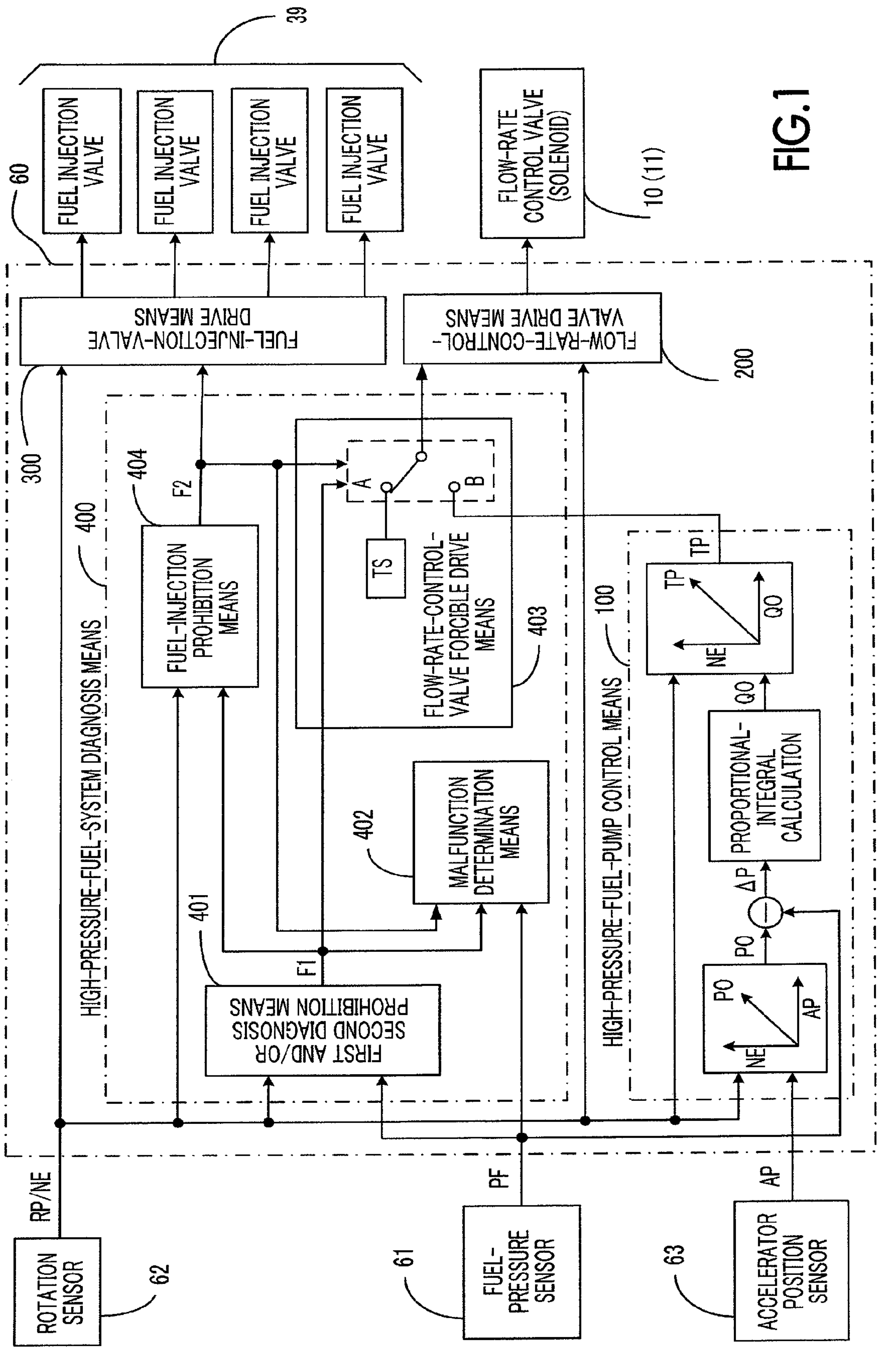
FIG. 1 is a functional block diagram of an ECU in a high-pressure-fuel-system control apparatus according to Embodiment 1 of the present invention.

Next, the specific configuration and operation of the ECU 60 according to the present invention will be explained with reference to a functional block diagram illustrated in FIG. 1. In FIG. 1, the EeU 60 includes a high-pressure-fuel-pump control means 100, a flow-rate-control-valve drive means 200, a fuel-injection-valve drive means 300, and a high-pressure-fuel-system diagnosis means 400; more particularly, the high-pressure-fuel-system diagnosis means 400 includes a first and/or second diagnosis prohibition means 401, a malfunction determination means 402, a flow-rate-control-valve forcible drive means 403, and a fuel-injection prohibition means 404.

In addition, as input means, various kinds of sensors including the fuel-pressure sensor 61 for detecting the fuel pressure PF inside the accumulator 36, the rotation sensor 62 for detecting a rotation position RP and the rotation speed NE of the internal-combustion engine 40, and the accelerator position sensor 63 for detecting an accelerator-pedal depressing amount AP are connected to the ECU 60.

Additionally, as output means, various kinds of actuators including the flow-rate control valve 10 (solenoid 11) for controlling the fuel discharge amount from the high-pressure fuel pump 20 and the fuel injection valve 39 for directly injecting and supplying the fuel into the cylinders of the internal-combustion engine 40 are connected to the ECU 60.

While, after the cylinder discrimination in the internal-combustion engine has been completed and the malfunction diagnosis, according to the present invention, on the high-pressure fuel system has been ended, the engine is operated, the high-pressure-fuel-pump control means 100 decides a target pressure PO, based on the rotation speed NE that is detected by the rotation sensor 62 and the accelerator-pedal depressing amount AP that is detected by the accelerator position sensor 63. After that, the high-pressure-fuel-pump control means 100 calculates the pressure difference AP between the target pressure PO and the fuel pressure PF that is detected by the fuel-pressure sensor 61 and then performs a proportional-integral calculation based on the pressure difference AP so as to calculate a target fuel discharge amount QO. Then, based on the target fuel discharge amount QO and the rotation speed NE that is detected by the rotation sensor 62, the high-pressure-fuel-pump control means 100 decides a valve closing timing (an energizing timing for the solenoid 11) TP for the flow-rate control valve 10.

While, after the cylinder discrimination in the internal-combustion engine has been completed and the malfunction diagnosis, according to the present invention, on the high-pressure fuel system has been ended, the engine is operated, a switch located in the flow-rate-control-valve forcible drive means 403 provided in the high-pressure-fuel-system diagnosis means 400 is connected to the contact B; as a result, the valve closing timing TP that has previously been decided is inputted to the flow-rate-control-valve drive means 200. The flow-rate-control-valve drive means 200 controls the energizing timing for the solenoid 11 in such a way that, based on the rotation position RP, of the internal-combustion engine 40, which is detected by the rotation sensor 62, the flow-rate control valve 10 is driven to be closed at the valve closing timing TP for the flow-rate control valve 10. In consequence, a fuel amount required for the coincidence between the target pressure PO and the fuel pressure PF inside the accumulator 36 is discharged from the high-pressure fuel pump 20 to the accumulator 36.

In addition, while, after the cylinder discrimination in the internal-combustion engine has been completed and the malfunction diagnosis, according to the present invention, on the high-pressure fuel system has been ended, the engine is operated, the fuel-injection-valve drive means 300 decides the fuel injection amount and fuel injection timing, based on the rotation speed NE and the rotation position RP, of the internal-combustion engine 40, which is detected by the rotation sensor 62, and driving information items from unillustrated various kinds of sensors, and then controls the valve-opening interval and the drive timing for the fuel injection valve 39. Accordingly, an appropriate fuel injection amount in accordance with the driving condition is injected and supplied into each cylinder of the internal-combustion engine 40, at an appropriate timing.

In addition, while, after the cylinder discrimination in the internal-combustion engine had been completed and the end of the malfunction diagnosis, according to the present invention, on the high-pressure fuel system has been ended, the engine is operated, the fuel-injection prohibition flag F2, for implementing a malfunction diagnosis, which is outputted by the fuel-injection prohibition means 404 provided in the high-pressure-fuel-system diagnosis means 400 is set to zero (false); therefore, the drive of the fuel injection valve 39 by the fuel-injection-valve drive means 300 is not prohibited.

Next, the operation of the high-pressure-fuel-system diagnosis means 400 according to the present invention will be explained. In the first place, the rotation speed NE detected by the rotation sensor 62 and the fuel pressure PF detected by the fuel-pressure sensor 61 are inputted to the first and/or second diagnosis prohibition means 401. In the first and/or second diagnosis prohibition means 401, in the case where the fuel pressure PF, which is detected when it is determined based on the rotation speed NE that the engine 40 has moved from the stop mode to the engine activation mode, is the same as or lower than a predetermined low-pressure value that is lower than the feed fuel pressure, the first diagnosis prohibition means makes a diagnosis-prohibition determination, whereby a diagnosis prohibition flag F1 is set to one (true) and outputted. In addition, in the case where the fuel pressure PF, which is detected when it is determined based on the rotation speed NE that the engine 40 has moved from the stop mode to the engine activation mode, is the same as or higher than a predetermined high-pressure value that is higher than the feed fuel pressure, the second diagnosis prohibition means makes a diagnosis-prohibition determination, whereby the diagnosis prohibition flag F1 is set to one (true) and outputted.

The diagnosis prohibition flag F1 is inputted to the malfunction determination means 402, the flow-rate-control-valve forcible drive means 403, and the fuel-injection prohibition means 404; in the case where the diagnosis prohibition flag F1 is set to one (true), the respective control items, related to the malfunction diagnosis, in the malfunction determination means 402, the flow-rate-control-valve forcible drive means 403, and the fuel-injection prohibition means 404 are prohibited from being implemented.

The diagnosis prohibition flag F1 outputted by the first and/or second diagnosis prohibition means 401, the fuel-injection prohibition flag F2 outputted by the fuel-injection prohibition means 404, and the fuel pressure PF detected by the fuel-pressure sensor 61 are inputted to the malfunction determination means 402.

In this situation, either in the case where the diagnosis prohibition flag F1 inputted from the first and/or second diagnosis prohibition means 401 is one (true) or in the case where the fuel-injection prohibition flag F2 outputted by the fuel-injection prohibition means 404 is zero (false), the malfunction diagnosis by the malfunction determination means 402 is prohibited from being implemented.

In contrast, in the case where the diagnosis prohibition flag F1 inputted from the first and/or second diagnosis prohibition means 401 is zero (false) and the fuel-injection prohibition flag F2 outputted by the fuel-injection prohibition means 404 is one (true), the malfunction diagnosis by the malfunction determination means 402 is permitted, and the rising condition, of the fuel pressure PF, detected by the fuel-pressure sensor 61 is inspected. Specifically, with regard to the fuel pressure PF, which is detected when it is determined based on the rotation speed NE that the engine 40 has moved from the stop condition to the engine activation condition, in the case where, during the interval in which the malfunction diagnosis by the malfunction determination means 402 is permitted, the rising amount of the fuel pressure PF exceeds a predetermined malfunction determination amount, it is determined that no malfunction is caused; in the case where the rising amount of the fuel pressure PF is the same as or smaller than the malfunction determination amount, it is determined that a malfunction is caused in any one of the high-pressure fuel pump 20, the flow-rate control valve 11 and the fuel-pressure sensor 61.

The diagnosis prohibition flag F1 outputted by the first and/or second diagnosis prohibition means 401, the fuel-injection prohibition flag F2 outputted by the fuel-injection prohibition means 404, and the valve closing timing TP outputted by the high-pressure-fuel-pump control means 100 are inputted to the flow-rate-control-valve forcible drive means 403.

In this situation, either in the case where the diagnosis prohibition flag F1 inputted from the first and/or second diagnosis prohibition means 401 is one (true) or in the case where the fuel-injection prohibition flag F2 outputted by the fuel-injection prohibition means 404 is zero (false), the Switch in the flow-rate-control-valve forcible drive means 403 is connected to the contact B, whereby the valve closing timing TP outputted by the high-pressure-fuel-pump control means 100 are inputted to the flow-rate-control-valve drive means 200.

In this regard, however, in order to control the energizing timing for the solenoid 11 so that the flow-rate control valve 10 is driven to be closed at the valve closing timing TP for the flow-rate control valve 10, the rotation position RP of the internal-combustion engine 40 is required to be known; therefore, it is not until the cylinder discrimination in the internal-combustion engine is completed and the rotation position RP is known that the driving and controlling of the flow-rate control valve 10 is started at the valve closing timing TP.

In contrast, in the case where the diagnosis prohibition flag F1 inputted from the first and/or second diagnosis prohibition means 401 is zero (false) and the fuel-injection prohibition flag F2 outputted by the fuel-injection prohibition means 404 is one (true), the switch in the flow-rate-control-valve forcible drive means 403 is connected to the contact A, whereby a forcible drive pulse TS for the flow-rate control valve 10 is outputted from the flow-rate-control-valve forcible drive means 403 to the flow-rate-control-valve drive means 200, and the flow-rate control valve 10 is forcibly driven so that, at that time, the high-pressure fuel pump 20 discharges the fuel of an approximately maximal amount that can be discharge-controlled.

The fuel-injection prohibition means 404 receives the diagnosis prohibition flag F1 inputted from the first and/or second diagnosis prohibition means 401 and the rotation speed NE, of the internal-combustion engine 40, detected by the rotation sensor 62, and performs the activation determination on and the cylinder discrimination in the engine 40, based on the rotation speed NE.

Only in the case where the diagnosis prohibition flag F1 inputted from the first and/or second diagnosis prohibition means 401 is one (true), the fuel-injection prohibition means 404 sets and maintains the fuel-injection prohibition flag F2 to be one (true) for the interval from the start of the engine 40 to the completion of the cylinder discrimination or for the interval in which a predetermined time elapses from the timing at which the engine 40 has been actuated and the cylinder discrimination has been completed.

Figure 3:
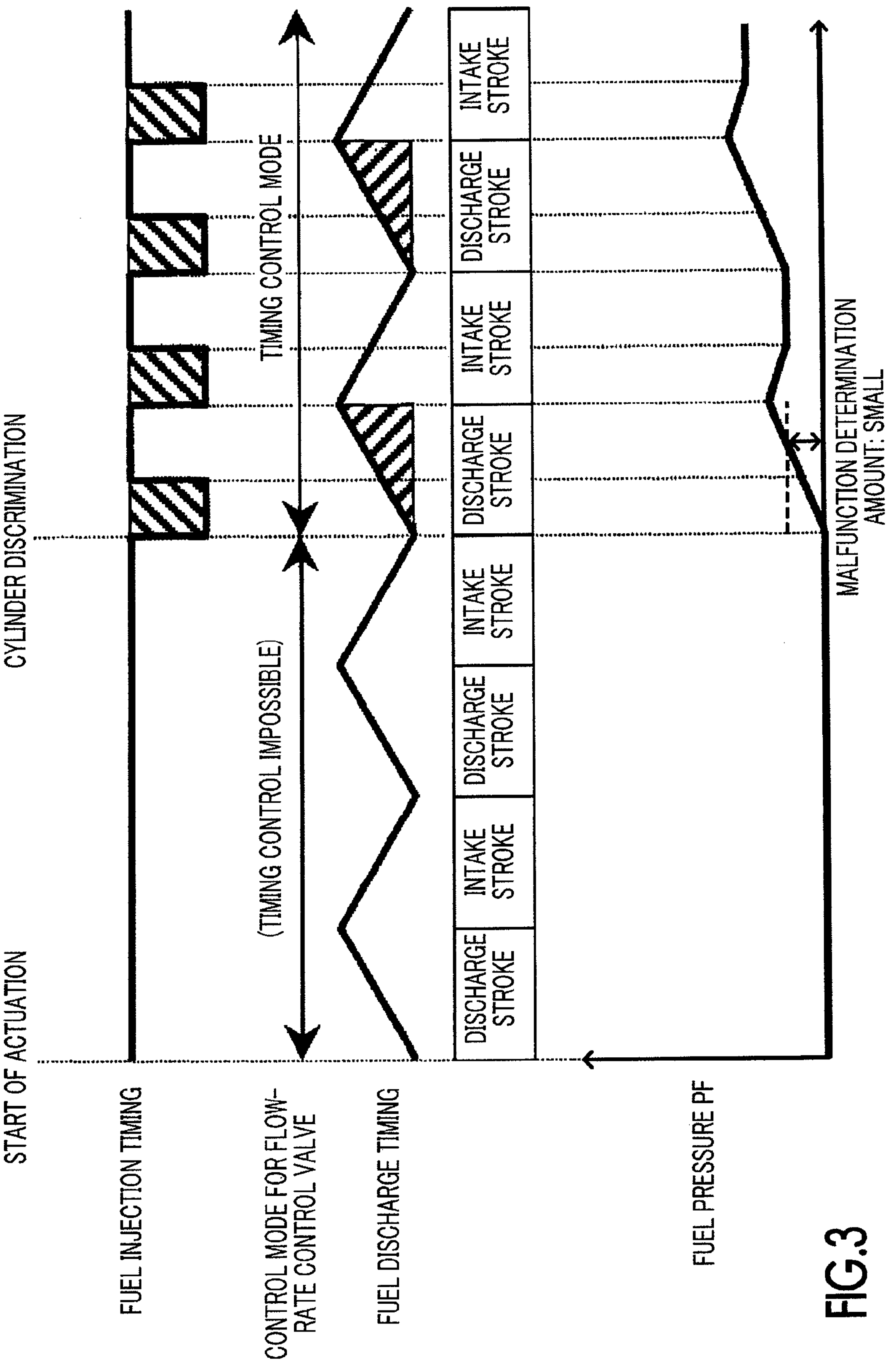
FIG. 3 is a time chart representing the operation of fuel injection control and fuel discharge control, upon the start of the engine, by a conventional control apparatus.
Figure 4:
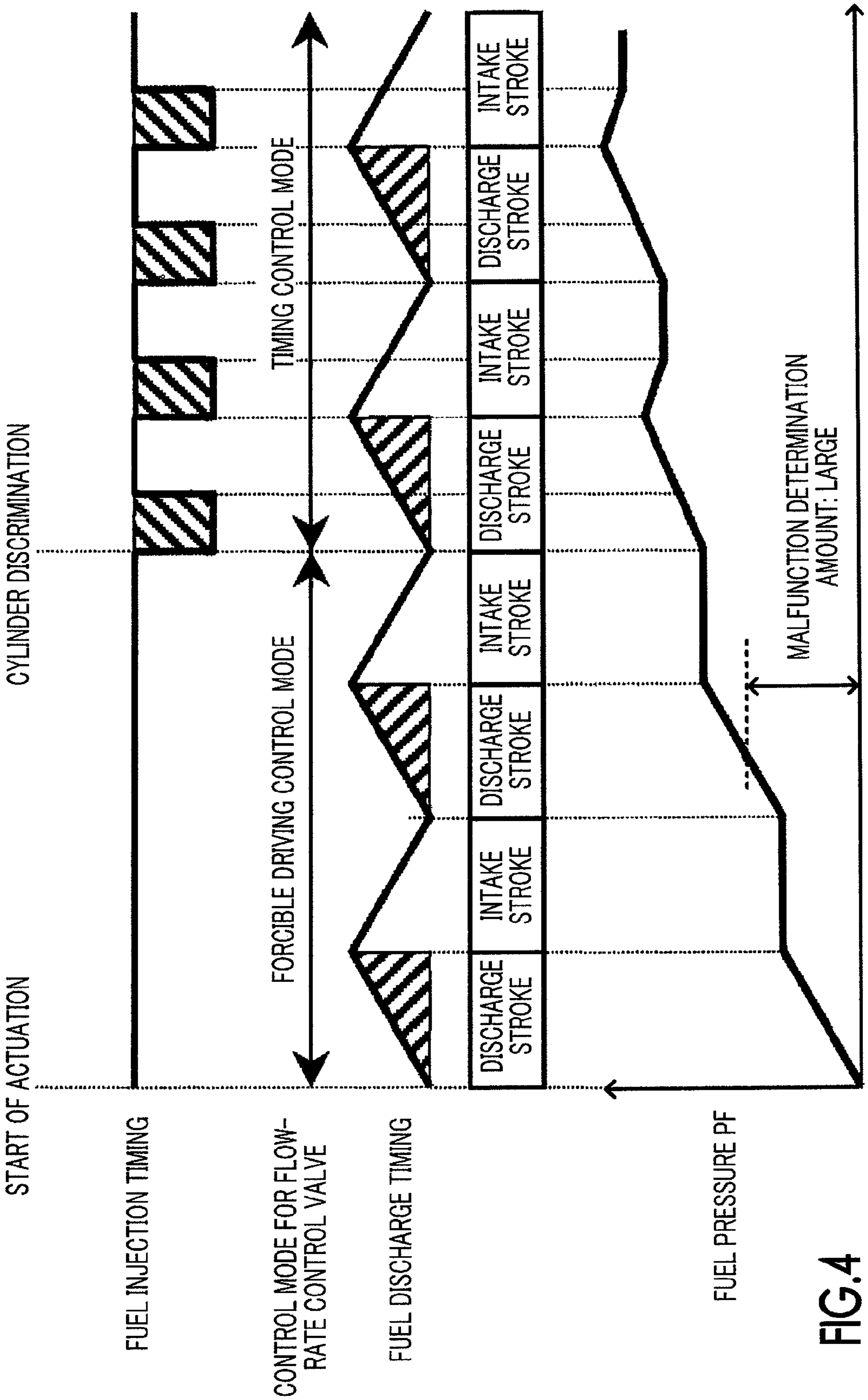
FIG. 4 is an example of a time chart representing the operation of fuel injection control and fuel discharge control, upon the start of the engine, in a high-pressure-fuel-system control apparatus according to Embodiment 1 of the present invention.
Figure 5:
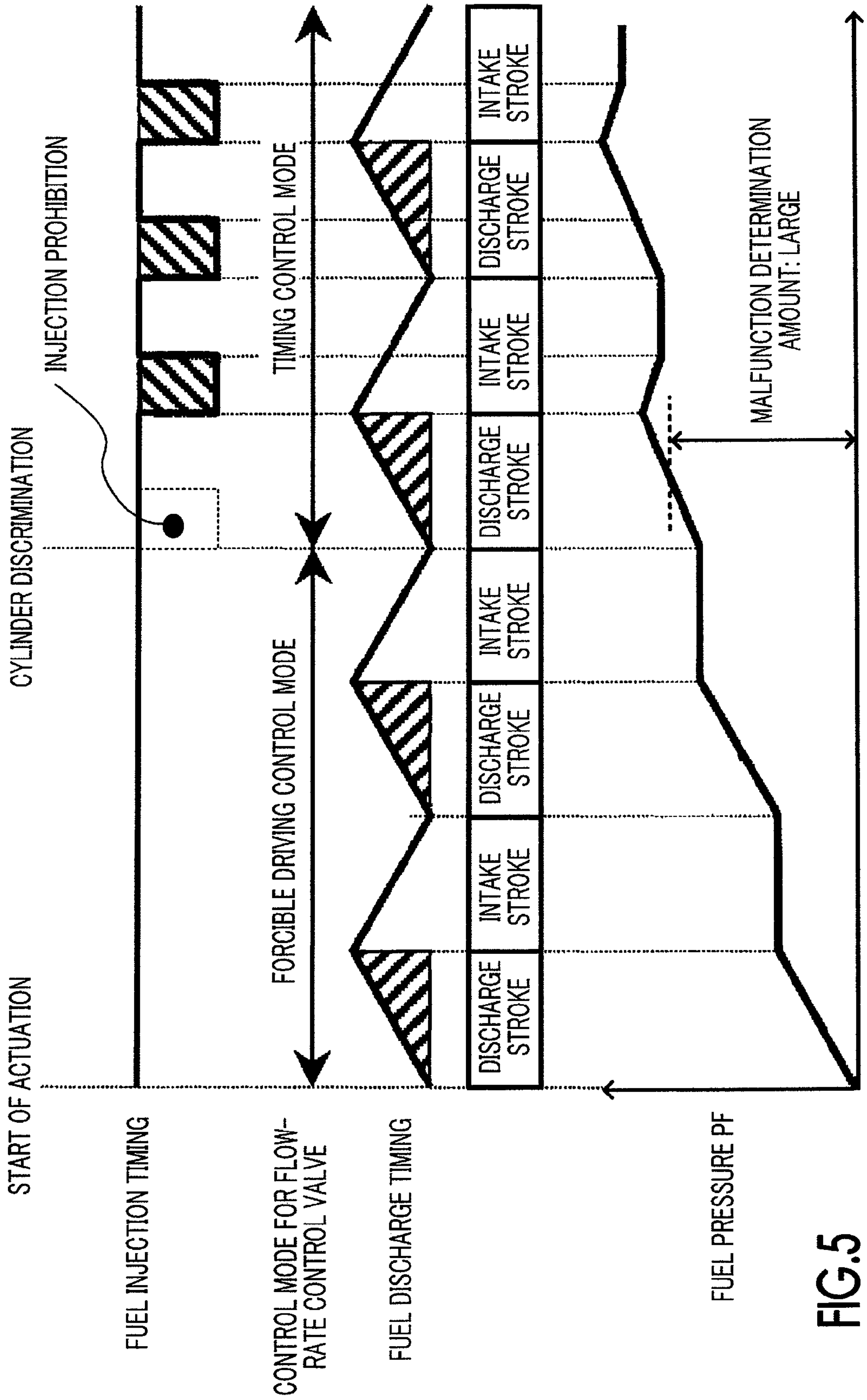
FIG. 5 is another example of a time chart representing the operation of fuel injection control and fuel discharge control, upon the start of the engine, in a high-pressure-fuel-system control apparatus according to Embodiment 1 of the present invention.

Next, the control operation of the ECU 60 according to the present invention will be explained with reference to time charts represented in FIGS. 3, 4, and 5. In addition, FIG. 3 is a time chart representing the operation of fuel injection control and fuel discharge control, upon the start of the engine, by a conventional control apparatus; FIGS. 4 and 5 are time charts each representing the operation of fuel injection control and fuel discharge control, upon the start of the engine, by a control apparatus according to the present invention.

In FIGS. 3, 4, and 5, the ordinate denotes, in sequence from top to bottom, the fuel injection timing, the control mode for the flow-rate control valve 10, the fuel discharge timing for the high-pressure fuel pump 20, and the fuel pressure PF inside the accumulator 36; the abscissa denotes the time that has elapsed from the start of the engine 40. Additionally, the interval, of the fuel injection timing, hatched with slanted lines represents an interval in which the fuel is actually injected.

Additionally, the “fuel intake stroke” and the “fuel discharge stroke” described under the fuel discharge timing explain that the high-pressure fuel pump 20 performs the fuel-fuel intake stroke and the fuel-fuel discharge stroke, and that, in the fuel discharge strokes, the interval, of the fuel injection timing, hatched with slanted lines represents an interval in which the fuel is actually injected.

As represented in FIG. 3, in the conventional control apparatus, the rotation position of the engine 40 is not known during the interval from the start of the engine to the completion of the cylinder discrimination; therefore, neither the fuel injection from the fuel injection valve nor the fuel discharge from the high-pressure fuel pump is controlled. Accordingly, in the conventional control apparatus, no malfunction diagnosis can be performed during the interval from the start of the engine to the completion of the cylinder discrimination.

Then, after, because of several rotations of the engine 40, the cylinder discrimination has been completed, the rotation position is known; thus, the respective drive timings for the fuel injection valve 39 and the flow-rate control valve 10 are concurrently started. Accordingly, it is inevitable that the fuel discharge and the fuel injection are concurrently performed. As a result, because the rising amount of the fuel pressure PF based on the fuel discharge is decreased due to the fuel injection that is performed concurrently with the fuel discharge, the malfunction determination amount utilized for performing the malfunction diagnosis cannot be set to a sufficiently large value.

In contrast, as represented in FIG. 4, in the control apparatus according to the present invention, during the interval from the start of the engine to the completion of the cylinder discrimination, by forcibly driving the flow-rate control valve 10, the high-pressure fuel pump 20 discharges the pressurized fuel, even though the rotation position of the engine 40 is not known. The foregoing interval is described as a “forcible driving control mode”; the flow-rate control valve 10 is forcibly driven so that the high-pressure fuel pump 20 discharges the fuel of a maximal amount that can be discharged during that interval.

During the interval of the forcible driving control mode, only the fuel discharge is implemented, whereby the decrease in the fuel pressure PF due to the fuel injection is not caused; therefore, large fuel-pressure rise can be obtained. Accordingly, the malfunction determination amount utilized for performing the malfunction diagnosis can be set to a large value.

As described above, in the control apparatus according to the present invention, the malfunction diagnosis can be performed during the activation of the engine, with the malfunction determination amount set to a sufficiently large value.

In addition, even though the starting timing of the first combustion caused by an injection of the fuel is delayed by one injection process, the malfunction determination amount can be set to a larger value, by, as represented in FIG. 5, prohibiting the first fuel injection immediately after the completion of the cylinder discrimination, thereby delaying the fuel-injection starting timing.

Any one of the methods represented in FIGS. 4 and 5 enables the malfunction diagnosis to be performed at a timing immediately after or before the cylinder discrimination, during the activation of the engine; therefore, during the operation of the engine, the appropriate timings for the fuel discharge and the fuel injection are avoided from being limited for the purpose of the malfunction diagnosis.

Figure 6:
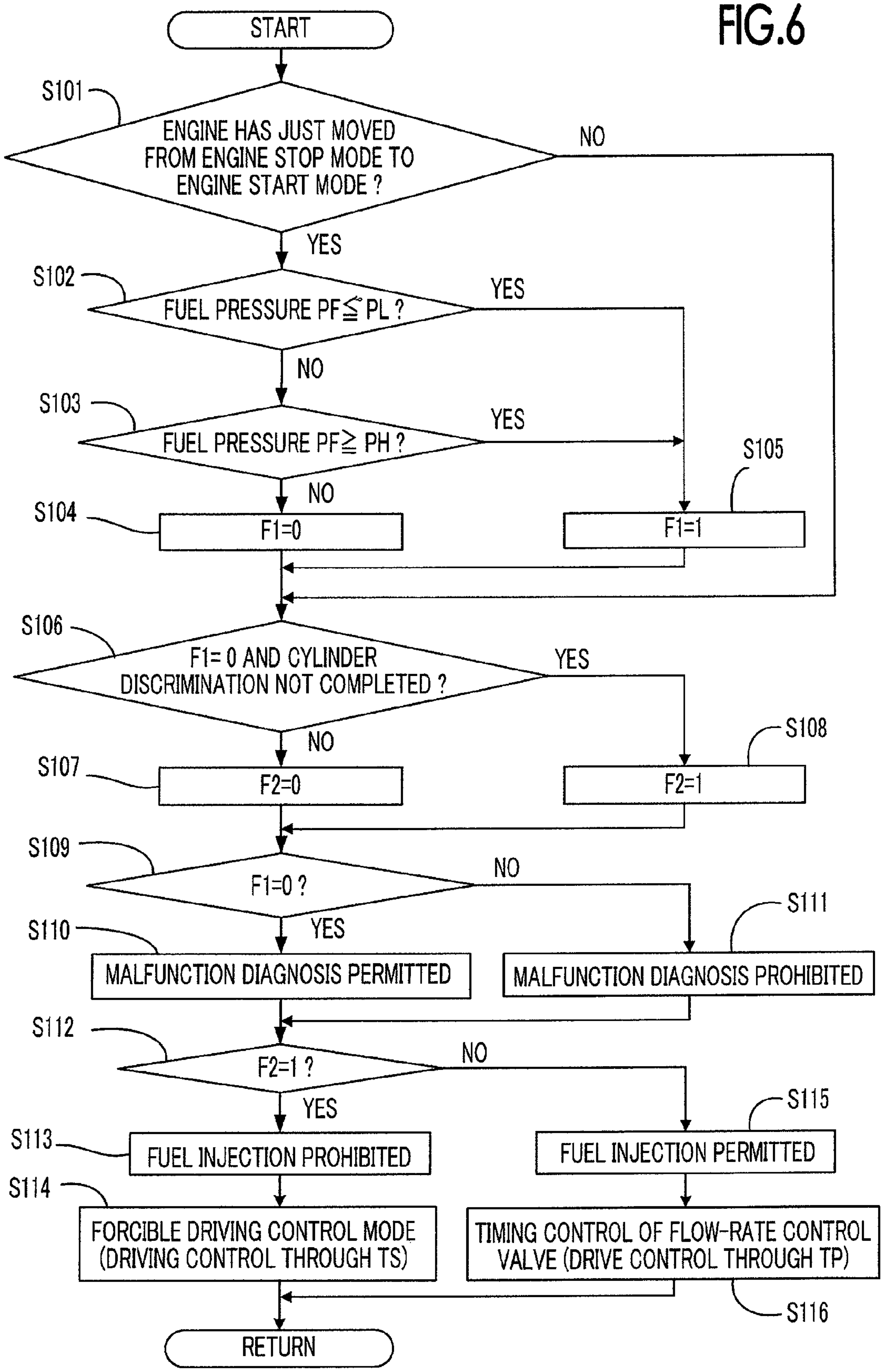
FIG. 6 is a flowchart representing the basic control operation of a high-pressure-fuel-system control apparatus according to Embodiment 1 of the present invention.

Next, the basic controlling operation of the ECU 60 according to the present invention will be explained with reference to a flowchart in FIG. 6. In FIG. 6, in the first place, in the step S101, it is determined “whether or not the engine has just moved from the stop mode (the rotation speed is zero) to the starting mode (the rotation speed is not zero)”. In this determination, in the case where it is determined that the engine has just moved from the stop mode to the starting mode, the EPU 60 proceeds to the step S102; in the case where it is not determined that the engine has just moved from the stop mode to the starting mode, the EPU 60 proceeds to the step S106.

In the step S101, in the case where it is determined that the engine has just moved from the stop mode (the rotation speed is zero) to the starting mode (the rotation speed is not zero), the ECU 60 proceeds to the step S102 and determines whether or not the fuel pressure PF is the same as or lower than a predetermined low-pressure value PL that is lower than the feed fuel pressure; in the following step S103, the ECU 60 determines whether or not the fuel pressure PF is the same as or higher than a predetermined high-pressure value PH that is higher than the feed fuel pressure.

In this situation, in the case where the fuel pressure PF is not the same as or lower than the predetermined low-pressure value PL that is lower than the feed fuel pressure and the fuel pressure PF is not the same as or higher than the predetermined high-pressure value PH that is higher than the feed fuel pressure, the ECU 60 proceeds to the step S104, sets the diagnosis prohibition flag F1 to zero (false), and then proceeds to the step S106.

In contrast, in the case where the fuel pressure PF is the same as or lower than the predetermined low-pressure value PL that is lower than the feed fuel pressure or in the case where the fuel pressure PF is the same as or higher than the predetermined high-pressure value PH that is higher than the feed fuel pressure, the ECU 60 proceeds to the step S105, sets the diagnosis prohibition flag F1 to one (true), and then proceeds to the step S106.

In the following step S106, it is determined whether the diagnosis prohibition flag F1 is zero (false) and the cylinder discrimination has not been completed. In this situation, in the case where the diagnosis prohibition flag F1 is zero (false) and the cylinder discrimination has not been completed, the ECU 60 proceeds to the step S108 and sets the fuel-injection prohibition flag F2 to one (true); in the contrary case, the ECU 60 proceeds to the step S107, sets the fuel-injection prohibition flag F2 to zero (false), and then proceeds to the step S109.

In the step S109, it is determined whether or not the diagnosis prohibition flag F1 is zero. In the case where it is determined that the diagnosis prohibition flag F1 is zero, the EPU 60 proceeds to the step S110 and permits the malfunction diagnosis to be performed; in the contrary case, the EPU 60 proceeds to the step S111, prohibits the malfunction diagnosis from being performed, and proceeds to the step S112. While the malfunction diagnosis is permitted, in the case where the rising amount of the fuel pressure PF eventually exceeds the malfunction determination amount, it is determined that no malfunction exists; in the case where the rising amount of the fuel pressure PF is eventually kept the same as or smaller than the malfunction determination amount, it is determined that a malfunction exists.

Then, in the step S112, it is determined whether or not the fuel-injection prohibition flag F2 is one (true). In the case where the fuel-injection prohibition flag F2 is one, the ECU 60 proceeds to the step S113 and then to the step S114, prohibits the control of fuel injection from the fuel injection valve 39 and permits applying the forcible driving control mode to the flow-rate control valve (the driving control of the flow-rate control valve 10 through the forcible drive pulse TS set by the flow-rate-control-valve forcible drive means 403), and ends the processing.

In the contrary case, the ECU 60 proceeds to the step S115 and then to the step S116, permits the control of fuel injection from the fuel injection valve 39 and application of the timing control mode to the flow-rate control valve (the driving control of the flow-rate control valve 10 through the valve closing timing TP set by the high-pressure-fuel-pump control means 100), and ends the processing.

Thereafter, the drive of the fuel injection valve is controlled in accordance with the permission or prohibition of the fuel injection valve decided in the step S113 or in the step S115, respectively; the drive of the flow-rate control valve is controlled in accordance with the control mode for the flow-rate control valve decided in the step S114 or in the step S116.

What is claimed is:

1. A control apparatus for an internal-combustion engine, comprising;

a high-pressure fuel pump for taking in a fuel from a fuel tank, pressurizing the fuel, and then discharging the pressurized fuel;

a fuel injection valve for injecting the fuel discharged from the high-pressure fuel pump into a cylinder of an internal-combustion engine;

a fuel-pressure sensor for detecting a pressure of the fuel discharged from the high-pressure fuel pump;

a high-pressure-fuel-pump control means for, during operation of the internal-combustion engine, controlling an amount of the fuel discharged from the high-pressure fuel pump, by controlling a drive timing for a flow-rate control valve provided in the high-pressure fuel pump in such a way that a target pressure set in accordance with an operation condition of the engine coincides with the fuel pressure detected by the fuel-pressure sensor; and a high-pressure-fuel-system diagnosis means for, upon activation of an engine, making the high-pressure fuel pump perform high-pressure-fuel discharge operation prior to initial fuel injection operation by the fuel injection valve and based on the condition of the resultant fuel-pressure rise, performing a diagnosis on whether or not a malfunction exists in a high-pressure fuel system.

2. The control apparatus for an internal-combustion engine according to claim 1, wherein in the case where a rising amount of the fuel pressure produced by the pressurized fuel discharged prior to the initial fuel injection operation by the fuel injection valve is the same as or smaller than a predetermined malfunction determination amount, said high-pressure-fuel-system diagnosis means determines that a malfunction is caused in any one of the high-pressure fuel pump, the flow-rate control valve and the fuel-pressure sensor.

3. The control apparatus for an internal-combustion engine according to claim 1, said high-pressure-fuel-system diagnosis means further comprising a flow-rate-control-valve forcible drive means for making the high-pressure fuel pump perform high-pressure-fuel discharge operation prior to the initial fuel injection operation by the fuel injection valve, by, before completion of cylinder discrimination during activation of the engine, forcibly driving the flow-rate control valve in such a way that the high-pressure fuel pump discharges the fuel of a maximal amount that can be discharge-controlled.

4. The control apparatus for an internal-combustion engine according to claim 1, said high-pressure-fuel-system diagnosis means further comprising a fuel-injection prohibition means for making the high-pressure fuel pump perform high-pressure-fuel discharge operation prior to the initial fuel injection operation by the fuel injection valve, by, during a predetermined interval immediately after completion of cylinder discrimination during activation of the engine, prohibiting fuel-injection operation by the fuel injection valve.

5. The control apparatus for an internal-combustion engine according to claim 1, further comprising a low-pressure fuel pump for pumping up the fuel in the fuel tank and discharging to the high-pressure fuel pump the fuel whose pressure is adjusted to be a feed fuel pressure, wherein said high-pressure-fuel-system diagnosis means is provided with a first diagnosis prohibition means for prohibiting implementation of control related to a diagnosis on whether or not a malfunction exists, in the case where the fuel pressure detected prior to the start of initial high-pressure-fuel discharge operation by the high-pressure fuel pump is the same as or lower than a predetermined low-pressure value that is lower than the feed fuel pressure.

6. The control apparatus for an internal-combustion engine according to claim 1, further comprising a low-pressure fuel pump for pumping up the fuel in the fuel tank and discharging to the high-pressure fuel pump the fuel whose pressure is adjusted to be a feed fuel pressure, said high-pressure-fuel-system diagnosis means is provided with a second diagnosis prohibition means for prohibiting implementation of control related to a diagnosis on whether or not a malfunction exists, in the case where the fuel pressure detected prior to the start of initial high-pressure-fuel discharge operation by the high-pressure fuel pump is the same as or higher than a predetermined high-pressure value that is higher than the feed fuel pressure.

7. The control apparatus for an internal-combustion engine according to claim 5, wherein said diagnosis prohibition means receives a rotation speed signal NE of the internal-combustion engine, detected by a rotation sensor and a fuel pressure signal PF detected by the fuel-pressure sensor, and in the case where the fuel pressure, which is detected when it is determined based on the rotation speed signal that the engine has moved from a stop mode to a engine-activation mode, differs from the feed fuel pressure, by a predetermined value or more, determines prohibition of the diagnosis and prohibits implementation of the flow-rate-control-valve forcible drive means or the fuel-injection prohibition means.

8. The control apparatus for an internal-combustion engine according to any one of claims 4 to 6, the control apparatus being characterized in that the high-pressure-fuel-system diagnosis means is provided with a malfunction determination means that receives respective outputs from the diagnosis prohibition means, the fuel-injection prohibition means, and the fuel-pressure sensor, determines that no malfunction exists, in the case where the rising amount of the fuel pressure, which is detected when it is determined based on a rotation speed signal NE of the internal-combustion engine that the engine has moved from a stop mode to a engine-activation mode, exceeds a predetermined malfunction determination amount, and determines that a malfunction exists in any one of the high-pressure fuel pump, the flow-rate control valve and the fuel-pressure sensor, in the case where the rising amount of the fuel pressure is the same as or smaller than the predetermined malfunction determination amount.

* * * * *